United States Patent
Kawai

(10) Patent No.: US 9,174,634 B2
(45) Date of Patent: Nov. 3, 2015

(54) CONTROL APPARATUS FOR HYBRID VEHICLE

(75) Inventor: Takashi Kawai, Gotemba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/402,218

(22) PCT Filed: May 22, 2012

(86) PCT No.: PCT/JP2012/063085
§ 371 (c)(1),
(2), (4) Date: Nov. 19, 2014

(87) PCT Pub. No.: WO2013/175578
PCT Pub. Date: Nov. 28, 2013

(65) Prior Publication Data
US 2015/0112533 A1    Apr. 23, 2015

(51) Int. Cl.
| | |
|---|---|
| *B60W 20/00* | (2006.01) |
| *B60W 10/26* | (2006.01) |
| *B60W 10/24* | (2006.01) |
| *B60W 10/06* | (2006.01) |
| *B60K 6/442* | (2007.10) |
| *F16F 15/31* | (2006.01) |

(52) U.S. Cl.
CPC ............... *B60W 20/00* (2013.01); *B60K 6/442* (2013.01); *B60W 10/06* (2013.01); *B60W 10/24* (2013.01); *B60W 10/26* (2013.01); *F16F 15/31* (2013.01); *Y02T 10/6204* (2013.01); *Y02T 10/6234* (2013.01); *Y10S 903/93* (2013.01)

(58) Field of Classification Search
CPC ..... B60W 20/00; B60W 10/06; B60W 10/26; B60W 10/24
USPC .......................................................... 701/22
See application file for complete search history.

(56) References Cited

U.S. PATENT DOCUMENTS

| | | |
|---|---|---|
| 5,007,303 A * | 4/1991 | Okuzumi ..................... 74/573.1 |
| 2004/0231897 A1 | 11/2004 | Kimura et al. |
| 2009/0182466 A1 | 7/2009 | Watanabe et al. |

(Continued)

FOREIGN PATENT DOCUMENTS

| | | |
|---|---|---|
| JP | H04-050534 A | 2/1992 |
| JP | 2005-002989 A | 1/2005 |
| JP | 2006-022890 A | 1/2006 |

(Continued)

*Primary Examiner* — Muhammad Shafi
*Assistant Examiner* — Majdi Alsomiri
(74) *Attorney, Agent, or Firm* — Kenyon & Kenyon LLP

(57) ABSTRACT

A control apparatus for a hybrid vehicle configured to control the hybrid vehicle provided with: an engine; a flywheel with a variable inertial mass; a rotary electric machine; a regenerating device; and an electricity storage device which is charged by regenerative power of the rotary electric machine and regenerative power of the regenerating device, is provided with: a reduction control device configured to reduce the number of engine revolutions to a stop allowable number of revolutions or less; a stop control device configured to stop the engine after the number of engine revolutions is reduced to the stop allowable number of revolutions or less; a specifying device configured to specify allowable charging power of the electricity storage device at the time of the stop demand; and an inertia control device configured to reduce the inertial mass with decreasing the specified allowable charging power.

7 Claims, 6 Drawing Sheets

(56) References Cited

U.S. PATENT DOCUMENTS

2012/0291589 A1* 11/2012 Jayakar et al. ............... 74/573.1
2014/0219848 A1* 8/2014 Rabhi ............................. 418/24

FOREIGN PATENT DOCUMENTS

| JP | 2007-315220 A | 12/2007 |
| JP | 2009-085400 A | 4/2009 |

* cited by examiner

Number of engine revolutions NE

CONTROL APPARATUS FOR HYBRID VEHICLE

CROSS-REFERENCE TO RELATED APPLICATION

This is a national phase application based on the PCT International Patent Application No. PCT/JP2012/063085 filed May 22, 2012, the entire contents of which are incorporated herein by reference.

TECHNICAL FIELD

The present invention relates to a control apparatus for a hybrid vehicle, configured to control the hybrid vehicle which is provided with a flywheel with a variable inertial mass on an engine shaft of an internal combustion engine.

BACKGROUND ART

There have been proposed various structures regarding the physical structure of the flywheel with the variable inertial mass. On the other hand, with regard to the control of the flywheel with the variable inertial mass, for example, there is a flywheel apparatus disclosed in Patent literature 1. According to the flywheel apparatus, it is considered that a time required for a speed change or gear change can be reduced by reducing the moment of inertia of the flywheel during downshifting.

There is also proposed an apparatus which performs engine control according to abnormality regarding the disconnection/connection of the flywheel, in a power plant configured to disconnect/connect the flywheel from/to the engine shaft (refer to Patent literature 2).

There is also proposed an apparatus which takes measures to prohibit idle stop and to correct a fuel injection amount if the flywheel with the variable inertial mass is abnormal (refer to Patent literature 3).

There is also proposed an apparatus which prevents an engine stop by increasing an inertial mass if deceleration control is performed at low speed in a variable inertial mass flywheel in which the inertial mass of the flywheel is varied by attaching/detaching a sub-flywheel to/from the flywheel (refer to Patent literature 4).

On the other hand, as an apparatus related to the control of the hybrid vehicle, there is proposed an apparatus which can perform power regeneration and achieves a required braking force, by driving auxiliaries to reduce state-of-charge (SOC) of an electricity storage device, if the power regeneration cannot be performed due to a charge limit and the required braking force cannot be demonstrated (refer to Patent literature 5).

CITATION LIST

Patent Literature

Patent Literature 1: Japanese Patent Application Laid Open No. 2009-085400
Patent Literature 2: Japanese Patent Application Laid Open No. 2007-315220
Patent Literature 3: Japanese Patent Application Laid Open No. 2006-022890
Patent Literature 4: Japanese Patent Application Laid Open No. 1104-050534
Patent Literature 5: Japanese Patent Application Laid Open No. 2005-002989

SUMMARY OF INVENTION

Technical Problem

In the hybrid vehicle, a demand for stopping the internal combustion engine can be frequently made because the hybrid vehicle is provided with a rotary electric machine as a power source in addition to the internal combustion engine. The stop demand may include a stop demand limited to during deceleration such as a fuel cut during deceleration, and a stop demand for so-called electric vehicle (EV) driving, or the like. In any case, it is hard to avoid a change in engine torque if the internal combustion engine is stopped. Thus, if noise and vibration (NV) of the vehicle is considered, it is hard to stop the internal combustion engine unconditionally at the time of the demand for stopping the internal combustion engine. The problem as described above is basically the same, regardless of whether the engine shaft of the internal combustion engine is physically connected to a drive shaft or is detached from the drive shaft by the action of a clutch or the like at the time point of the engine stop measure. In the former case, there is also a possibility that torque variation of the drive shaft becomes obvious particularly with the engine stop. It is therefore desirable that the number of engine revolutions of the internal combustion engine is sufficiently reduced if the internal combustion engine is stopped at the time of the stop demand.

On the other hand, there is some fuel consumption in an operating period of the internal combustion engine. From the viewpoint of reducing the fuel consumption to improve fuel efficiency, it is desirable to more quickly reduce the number of engine revolutions. Moreover, if a resonance band of the internal combustion engine is passed in the process of reducing the number of engine revolutions, it is advantageous in terms of the NV to quickly pass through the resonance band.

Here, there is known a configuration in which electric power is regenerated during the reduction in the number of engine revolutions. The electric power can be regenerated while the number of engine revolutions is forcibly reduced by a power generation load (or regenerative torque), if a power generating apparatus such as, for example, an alternator and a motor generator is connected to the engine shaft via a belt, a chain, a sprocket, a pulley or the like, or if the power generating apparatus is connected to the engine shaft via a gear having gear teeth which engage with gear teeth formed on an outer circumference surface of the flywheel, or if the engine shaft and an output shaft of the power generating apparatus are directly connected. Alternatively, as a more complicated configuration, as in a so-called two motor hybrid, even if there is provided a configuration in which the engine shaft of the internal combustion engine and output shafts of a plurality of motor generators are connected to each rotating element of a planetary gear mechanism with two degrees of freedom of rotation to enable power transfer, the power regeneration can be performed during the reduction in the number of engine revolutions, by one motor generator that applies reaction torque to the internal combustion engine in the normal cases.

According to the vehicle configuration as described above, it is possible to reduce the number of engine revolutions at an earlier stage while regenerating a part of the engine torque as the electric power. It is therefore possible to stop the internal combustion engine at an earlier stage without waiting for a spontaneous reduction in the number of engine revolutions, and it is remarkably effective to reduce the fuel consumption.

In particular, if the engine shaft of the internal combustion engine is provided with the variable inertia mass flywheel, more efficient power regeneration can be expected by increasing the inertial mass during the reduction in the number of engine revolutions.

By the way, there is a limit on charging power (i.e. charging speed) allowable in charging the electricity storage device. The limit is sometimes derived from the state of charge (SOC: a state of charge or a standardized index value which represents the state of charge) of the electricity storage device, or is sometimes derived from physical constitution, standard, or specification of the electricity storage device. In any case, it is not desirable to perform the charging at a charging speed which exceeds charge limit power corresponding to the limit (i.e. allowable charging power).

Therefore, if regenerative power infringes of the allowable charging power, the internal combustion engine cannot be stopped in response to the stop demand. In practice, it is possible to take measures such as increasing the allowable charging power by using power consumption of various auxiliaries of the vehicle; however, it is hard to avoid that the start timing of the control associated with the engine stop is delayed. If the engine stop is delayed, the fuel consumption increases by that much. Thus, the fuel efficiency of the internal combustion engine relatively decreases.

Particularly in the hybrid vehicle, so-called regenerative braking is preferably performed by using the regenerative torque associated with the power regeneration, as braking torque, during deceleration. If a period of the regenerative braking overlaps with a period of the reduction in the number of engine revolutions associated with the stop demand, both the regenerative power in the regenerative braking and the regenerative power associated with the reduction in the number of engine revolutions are used to charge the electricity storage device, and the regenerative power more likely conflicts with or is incompatible with the allowable charging power.

The above various patent literatures do not have any disclosure or indication which leads to the solutions of the problem, and thus hardly solve the problem. In other words, the apparatuses described in the literatures more likely cause the time delay until the internal combustion engine is actually stopped in response to the demand for stopping the internal combustion engine, and the effect associated with the improvement in the fuel efficiency cannot be sufficiently achieved, which is technically problematic.

It is therefore an object of the present invention to provide a control apparatus for a hybrid vehicle, configured to improve the fuel efficiency of the internal combustion engine in the hybrid vehicle which is provided with the flywheel with the variable inertial mass.

Solution to Problem

The above object of the present invention can be achieved by a control apparatus for a hybrid vehicle configured to control the hybrid vehicle, the hybrid vehicle provided with: an internal combustion engine in which an engine shaft is connected to a drive shaft connected to an axle; a flywheel with a variable inertial mass connected to the engine shaft; a rotary electric machine configured to perform power regeneration due to torque supply to the drive shaft and torque input from the drive shaft; a regenerating device configured to perform power generation due to torque input from the engine shaft; and an electricity storage device configured to be charged by regenerative power of the rotary electric machine and regenerative power of the regenerating device, said control apparatus provided with: a reduction control device configured to reduce the number of engine revolutions of the internal combustion engine to a stop allowable number of revolutions or less, through the regenerating device at a time of a demand for stopping the internal combustion engine; a stop control device configured to stop the internal combustion engine after the number of engine revolutions is reduced to the stop allowable number of revolutions or less; a specifying device configured to specify allowable charging power of the electricity storage device at the time of the stop demand; and an inertia control device configured to reduce the inertial mass with decreasing the specified allowable charging power.

According to the control apparatus for the hybrid vehicle of the present invention, the allowable charging power of the electricity storage device is referred to at the time of the demand for stopping the internal combustion engine, and the inertial mass of the flywheel is changed to increase or decrease, according to a large or small amount of the allowable charging power. The change in the inertial mass is desirably at least a multistage change, and is preferably a continuous change (including a multistage change with a sufficiently small step width).

The regenerative power of the regenerating device increases if the inertial mass of the flywheel is relatively large (i.e. as the inertial mass gets to have higher inertia), and decreases if the inertial mass is relatively small (i.e. as the inertial mass gets to have lower inertia). In other words, if the inertial mass of the flywheel is controlled to a relatively lower inertia side, the regenerative power of the entire vehicle decreases.

Therefore, according to the control apparatus for the hybrid vehicle of the present invention, it is possible to continue the measure to reduce the number of engine revolutions which is required to stop the internal combustion engine, even in a state in which the electricity storage device sufficiently stores electric power (i.e. in a small allowable charging power state). Alternatively, even if it is necessary to take a measure to increase the allowable charging power due to power consumption of various auxiliaries before taking the measure to reduce the number of engine revolutions, it is possible to start the measure to reduce the number of engine revolutions at an earlier stage because the various auxiliaries have less power consumption.

As a result, according to the control apparatus for the hybrid vehicle of the present invention, it is possible to reduce the number of engine revolutions to the stop allowable number of revolutions as early as possible, thereby improving the fuel efficiency of the internal combustion engine.

The inertial mass of the flywheel of the present invention is variable in a binary, stepwise, or continuous manner. A physical structure for varying the inertial mass is not unambiguously defined, and can adopt various known aspects. Preferably, however, the inertial mass of the flywheel of the present invention is variable in multiple stages or in a continuous manner. For example, the multistage or continuous change in the inertial mass may be realized by accommodating a magnetic fluid in a disk-like flywheel such that the magnetic fluid can move in a radial direction and by changing a position of the magnetic fluid in the radial direction in a stepwise or continuous manner, or by similar actions.

The hybrid vehicle of the present invention is provided with the rotary electric machine which functions as a power source in addition to the internal combustion engine. The rotary electric machine is preferably a motor generator, and is configured to input and output torque between the rotary electric machine and the drive shaft connected to a driving wheel via the axle (i.e. connected to the axle). The output of the torque to the drive shaft namely means power running drive of this additional rotary electric machine, and has a meaning of assisting engine torque of the internal combustion engine, or a meaning of driving the hybrid vehicle instead of the engine torque. On the other hand, the input of the torque from the drive shaft namely means regenerative drive of the rotary electric machine, and has a meaning of using the drive shaft torque to regenerate electric power by supplying regenerative torque to the drive shaft.

Here, the regenerating device provided for the hybrid vehicle of the present invention is a device configured to regenerate electric power by using the torque of the engine shaft. For example, in a configuration in which the rotary electric machine and the internal combustion engine are arranged in series with the drive shaft, the rotary electric machine can add the torque to both the drive shaft and the engine shaft, and thus can function as the regenerating device of the present invention. In other words, each of the rotary electric machine and the regenerating device of the present invention is not necessarily an independent apparatus, and practical aspects thereof can vary depending on the configuration of the hybrid vehicle. Moreover, the regenerating device may be a generator such as an alternator, connected to the engine shaft. In this case, if a selective power cutoff device such as a clutch is disposed between a flywheel downstream side of the engine shaft and the drive shaft, the reduction in the number of revolutions of the internal combustion engine can be independently performed, and it is advantageous from the viewpoint of preventing the torque variation of the drive shaft.

In one aspect of the control apparatus for the hybrid vehicle of the present invention, said inertia control device reduces the inertial mass with decreasing difference between the specified allowable charging power and a sum of the regenerative power of the rotary electric machine and the regenerative power of the regenerating device.

According to this aspect, the condition derived from the allowable charging power of the electricity storage device is further limited, and the inertial mass of the flywheel is varied according to the difference between the regenerative power of the entire vehicle (or the sum of the regenerative power of the regenerating device and the regenerative power of the rotary electric machine) and the allowable charging power. Even if the allowable charging power of the electricity storage is relatively large, if the regenerative power of the entire vehicle is also large, then, there is a possibility that the power regeneration measure associated with the reduction in the number of engine revolutions conflicts with or is incompatible with the allowable charging power of the electricity storage. According to this aspect, however, in the case as described above, the inertial mass of the flywheel is changed to or maintained on the lower inertia side. Thus, the reduction in the number of engine revolutions can be continued.

Moreover, with respect to the sum of particular regenerative powers, the difference decreases with decreasing the allowable charging power. Therefore, the action or operation of the inertia control device in this aspect is included in the action or operation of the inertial control device of the present invention which reduces the inertial mass with decreasing the allowable charging power.

In another aspect of the control apparatus for the hybrid vehicle of the present invention, said inertia control device controls the inertial mass on the basis of the specified allowable charging power during regenerative braking by the rotary electric machine.

The situation in which the regenerative power of the vehicle conflicts with or is incompatible with the allowable charging power can significantly occur in a period in which the regenerative braking is performed by the rotary electric machine. It is therefore possible to prevent inertial mass control which is excessively inclined to be safe, by controlling the inertial mass in view of the regenerative power, only during the regenerative braking.

In another aspect of the control apparatus for the hybrid vehicle of the present invention, a judging device configured to judge whether or not the flywheel is in a low inertia fail state which is a state in which a function of varying the inertial mass is lost in a state in which the inertial mass is less than a predetermined value; and a correcting device configured to correct a lowest number of revolutions of the internal combustion engine corresponding to required output of the internal combustion engine, to a higher revolution side, in comparison with a case where the flywheel is not in the low inertia fail state, if it is determined that the flywheel is in the low inertia fail state.

If the flywheel loses the function of varying the inertial mass on the lower inertia side (or on a side with a small inertial mass) regardless of temporarily or permanently, a NV suppression effect which is an original meaning of the flywheel is likely influenced. For example, at an operating point in a low-revolution high-torque region in which the internal combustion engine has a relatively large torque variation, there can be a significant need to avoid a so-called booming sound associated with the torque variation. An operating point region in which the booming sound can be avoided (e.g. the lowest value of the number of engine revolutions) is normally on the premise that the flywheel is controlled to a higher inertia side (or on a side with a large inertial mass and with a high NV suppression effect). Thus, if the flywheel is in the low inertial fail state, and particularly is in an always low inertial fail state, the booming sound likely becomes obvious because the flywheel does not demonstrate the originally expected effect.

According to this aspect, if it is judged that the flywheel is in the low inertia fail state, the lowest number of revolutions at the operating point (or, preferably, of a combination of the number of engine revolutions and the engine torque) determined for the required output of the internal combustion engine is corrected to a higher revolution side. It is therefore possible to suppress the deterioration of the NV.

Whether or not the flywheel is in the low inertia fail state can be judged on the basis of a change in the number of engine revolutions when the inertia control is performed by the inertia control device described above, a difference in the number of engine revolutions between low inertia control and high inertia control, or the like. Alternatively, inertial mass change control for the judgment may be performed at predetermined timing.

The operation and other advantages of the present invention will become more apparent from embodiments explained below.

DESCRIPTION OF EMBODIMENTS

<Embodiments of the Invention>

Hereinafter, the embodiments of the present invention will be explained with reference to the drawings.

<First Embodiment>

<Configuration of Embodiment>

Figure 1:
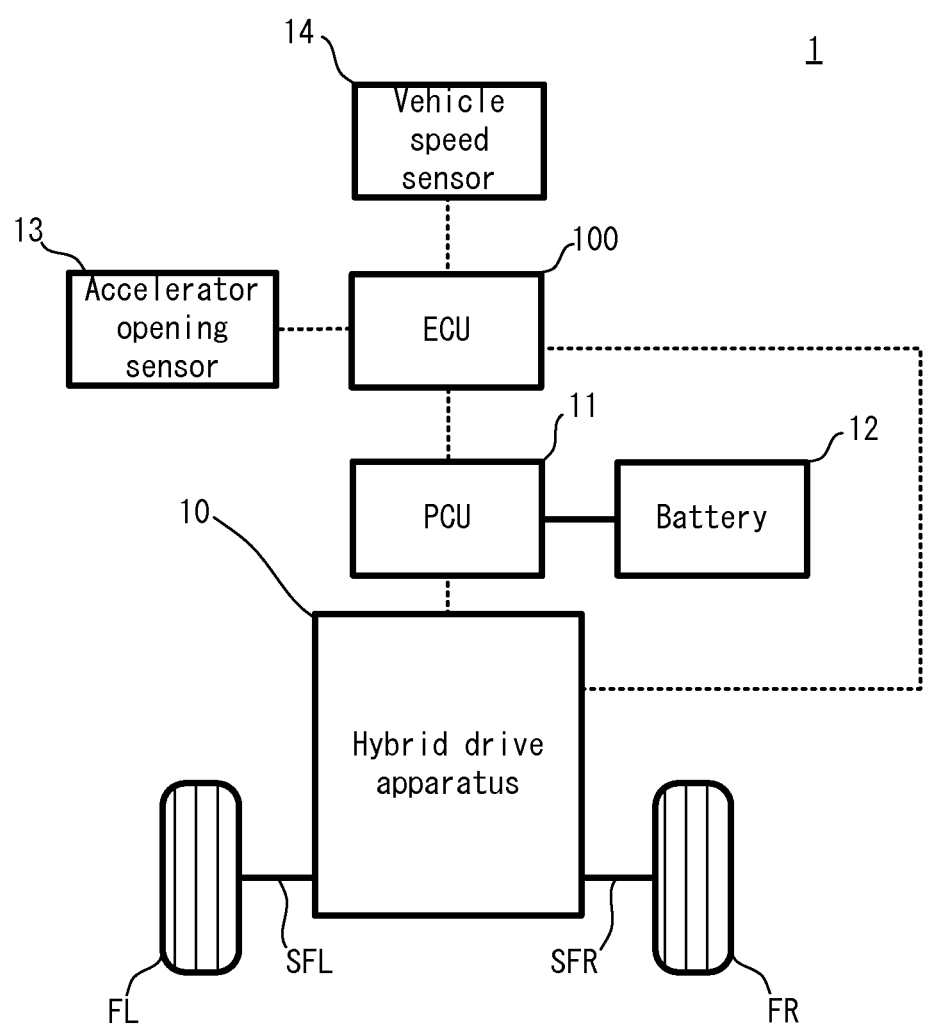
FIG. 1 is a schematic configuration diagram conceptually illustrating a configuration of a hybrid vehicle in a first embodiment of the present invention.

Firstly, with reference to FIG. 1, a configuration of a hybrid vehicle 1 in a first embodiment of the present invention will be explained. FIG. 1 is a schematic configuration diagram conceptually illustrating the configuration of the hybrid vehicle 1.

In FIG. 1, the hybrid vehicle 1 is one example of the "hybrid vehicle" of the present invention which is provided with an electronic control unit (ECU) 100, a power control unit (PCU) 11, a battery 12, an accelerator opening sensor 13, a vehicle speed sensor 14, and a hybrid drive apparatus 10.

The ECU 100 is provided with a central processing unit (CPU), a read only memory (ROM), a random access memory (RAM) and the like. The ECU 100 is an electronic control unit configured to control the operation of each unit of the hybrid vehicle 1, and is one example of the "control apparatus for the hybrid vehicle" of the present invention. The ECU 100 is configured to perform inertia control described later, in accordance with a control program stored in the ROM.

The ECU 100 is an integrally-configured electronic control unit configured to function as one example of each of the "reduction control device", the "stop control device", the "specifying device", the "inertia control device", the "judging device" and the "correcting device" of the present invention, and all the operations associated with each of the devices are performed by the ECU 100. The physical, mechanical and electrical configurations of each of the devices of the present invention, however, are not limited to this example. For example, each of the devices may be configured as various computer systems such as a plurality of ECUs, various processing units, various controllers or microcomputer apparatuses.

The hybrid drive apparatus 10 is a drive unit which drives the hybrid vehicle 1 by supplying drive torque as a driving force to a left axle SFL (corresponding to a left front wheel FL) and a right axle SFR (corresponding to a right front wheel FR) which are axles of the hybrid vehicle 1. A detailed configuration of the hybrid drive apparatus 10 will be detailed later.

The PCU 11 is a power control unit, which includes a not-illustrated inverter configured to convert direct-current (DC) power extracted from the battery 12 to alternating-current (AC) power and supply it to a motor generator MG and an alternator 500 described later, and configured to convert AC power generated by the motor generator MG and the alternator 500 to DC power and supply it to the battery 12, configured to control input/output of electric power between the battery 12 and the motor generator MG or the alternator 500. The PCU 11 is electrically connected to the ECU 100, and the operation thereof is controlled by the ECU 100.

The battery 12 is a battery unit having a configuration in which a plurality of (e.g. several hundreds of) unit battery cells such as, for example, lithium ion battery cells are connected in series, and is one example of the "electricity storage device" of the present invention.

The accelerator opening sensor 13 is a sensor configured to detect an accelerator opening degree Ta which is a manipulated variable or operation amount of a not-illustrated accelerator pedal of the hybrid vehicle 1. The accelerator opening sensor 13 is electrically connected to the ECU 100, and the detected accelerator opening degree Ta is referred to by the ECU 100 with a regular or irregular period.

The vehicle speed sensor 14 is a sensor configured to detect a vehicle speed V of the hybrid vehicle 1. The vehicle speed sensor 14 is electrically connected to the ECU 100, and the detected vehicle speed V is referred to by the ECU 100 with a regular or irregular period.

Figure 2:
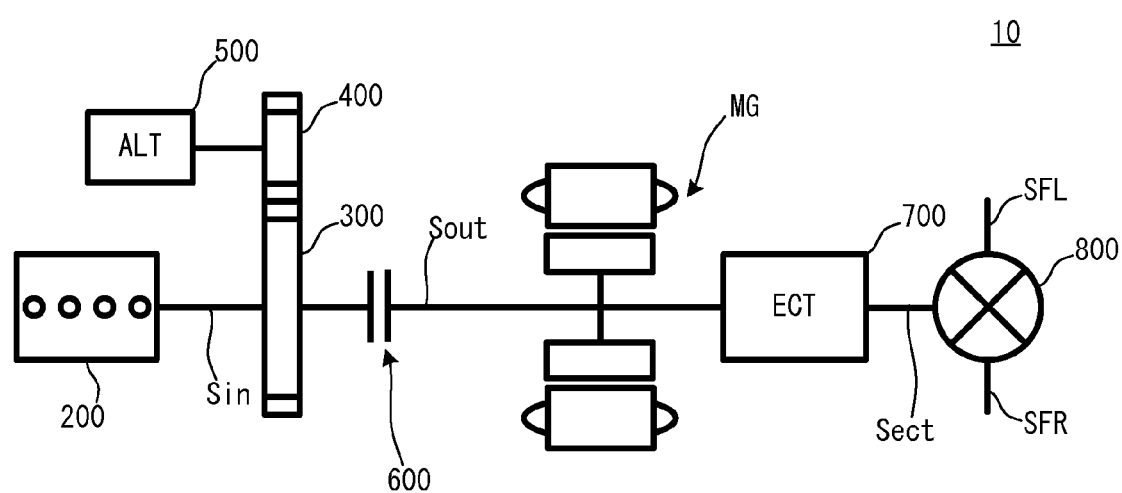
FIG. 2 is a schematic configuration diagram conceptually illustrating a configuration of a hybrid drive apparatus in the hybrid vehicle in FIG. 1.

Next, with reference to FIG. 2, the detailed configuration of the hybrid drive apparatus 10 will be explained. FIG. 2 is a schematic configuration diagram conceptually illustrating the configuration of the hybrid drive apparatus 10. In FIG. 2, the same parts as those in FIG. 1 will carry the same reference numeral, and the explanation thereof will be omitted as occasion demands.

In FIG. 2, the hybrid drive apparatus 10 is provided with an engine 200, a flywheel 300, an intermediate gear 400, the alternator 500, a clutch 600, a motor generator MG, an electronic controlled transmission (ECT) 700, and a deceleration apparatus 800.

The engine 200 is a gasoline engine configured to function as a main power source of the hybrid vehicle 1, and is one example of the "internal combustion engine" of the present invention. The engine 200 is a known gasoline engine, and a detailed configuration thereof will be omitted herein. Here, the engine 200 is assumed to be the gasoline engine; however, the "internal combustion engine" of the present invention can adopt various forms in terms of a fuel type, a fuel supply aspect, a configuration of an intake/exhaust system, a configuration of a valve train, presence or absence of a supercharger, configurations of various auxiliaries, and the like. Engine torque Te, which is output power of the engine 200, is transmitted to an input shaft Sin of the hybrid drive apparatus 10 via a not-illustrated crankshaft, which is one example of the "engine shaft" of the present invention.

The flywheel 300 is a substantially disk-like vibration suppressing apparatus which is connected to the input shaft Sin and which rotates integrally with the crankshaft of the engine 200. On an outer circumference surface in a disk-like main body of the flywheel 300, there are formed a plurality of gear teeth which engage with gear teeth of the intermediate gear 400. In the main body of the flywheel 300, there are formed a plurality of cylindrical accommodation units extending in an arc shape in a radial direction from near the center, and each of the accommodation units accommodates a magnetic fluid such that the magnetic fluid can move in the accommodation unit. The flywheel 300 has a built-in magnetic field generating apparatus which can generate a magnetic field for changing the position of the magnetic fluid in a longitudinal direction of the accommodation unit, and the position of the magnetic fluid in the accommodation unit changes according to the strength of the magnetic field generated by the magnetic field generating apparatus.

The magnetic fluid in the accommodation units has a mass. Therefore, if the position of the magnetic fluid in the accommodation units changes, the inertial mass of the flywheel 300 changes. In other words, as the magnetic fluid is positioned closer to the center, the flywheel 300 has lower inertia (or a smaller inertial mass), and as the magnetic fluid is positioned closer to the outer circumferential surface, the flywheel 300 has higher inertia (or a larger inertial mass). A relation between the inertial mass of the flywheel 300 and the magnitude of the magnetic field generated by the magnetic field generating apparatus is given experimentally and theoretically in advance. Moreover, the magnetic field generating apparatus is electrically connected to the ECU 100, and is driven under the control by the ECU 100. The ECU 100 therefore can control the inertial mass of the flywheel 300 to a desired value, continuously variably.

The flywheel 300 is one example of the "flywheel" of the present invention, and particularly adopts a configuration in which the inertial mass is controlled by the change in the position of the magnetic fluid. The inertial mass control aspect as described above, however, is merely one example, and various known configurations can be applied to the physical configuration of the flywheel with the variable inertial mass. The intermediate gear 400 which rotates integrally with the flywheel 300 is connected to the alternator 500.

The alternator 500 is a known AC power generating including a rotor, a stator, a regulator, a rectifier, and the like, and is one example of the "regenerating device" of the present invention. The alternator 500 is electrically connected to the ECU 100, and a power generation load thereof is controlled by the ECU 100. The alternator 500 can reduce the number of engine revolutions NE by using the power generation load at the time of an engine stop demand described later, and can perform power regeneration according to the power generation load. Generated regenerative power is supplied to the battery 12.

Regenerative power Pestp during the reduction in the number of engine revolutions can be calculated by the ECU 100 in accordance with various known calculation routines on the basis of the magnitude of the power generation load (or regenerative torque of the alternator 500) and a rotational speed of the input shaft Sin.

The clutch 600 is a known electromagnetic clutch apparatus which uses an electromagnetic actuator such as a solenoid, to engage or disengage a pair of engaging elements. One of the engaging elements of the clutch 600 is connected to the input shaft Sin on a downstream side in a power transmission direction of the flywheel 300, and the other engaging element is connected to a drive shaft Sout which is a power output shaft of the hybrid drive apparatus 10. The clutch 600 is electrically connected to the ECU 100, and a connection/disconnection state of the clutch 600 is controlled by the ECU 100.

The motor generator MG is an electric motor generator provided with a power running function for converting electrical energy into kinetic energy, and a regeneration function for converting the kinetic energy into the electrical energy. The motor generator MG is one example of the "rotary electric machine" of the present invention. The motor generator MG is configured, for example, as a three-phase synchronous motor generator, and is provided with a rotor having a plurality of permanent magnets on an outer circumferential surface, and a stator around which a three-phase coil for forming a rotating magnetic field is formed.

The rotor of the motor generator MG is connected to the drive shaft Sout. If the motor generator MG is driven in a power running state, motor torque Tmg acts on the drive shaft Sout. In this case, the motor generator MG functions as a power source which applies a driving force to a driving wheel of the hybrid vehicle 1. If the aforementioned pair of engaging elements of the clutch 600 is in an engagement state, the engine torque Te and the motor torque Tmg cooperate with each other to provide required torque. Moreover, if the pair of engaging elements of the clutch 600 is in a disengagement state, so-called EV driving is realized in which only the motor torque Tmg provides the required torque.

On the other hand, if the motor generator MG is driven in a regenerative state, the power regeneration (i.e. power generation) using the drive torque which acts on the drive shaft Sout can be performed. In this case, the motor generator MG functions as a braking apparatus which applies a braking force to the driving wheel of the hybrid vehicle 1, and regenerative braking is realized. The regenerative power during the regenerative braking is variable according to regenerative torque of the motor generator MG, i.e. a power generation load, and the braking force associated with the regenerative braking increases with increasing regenerative power. Regenerative power Pmg of the motor generator MG can be calculated by the ECU 100 in accordance with various known calculation routines on the basis of the magnitude of the regenerative torque of the motor generator MG and a rotational speed of the motor generator MG (i.e. a rotational speed of the drive shaft Sout).

The ECT 700 is a known electronic control stepped transmission which can change a rotational speed ratio (i.e. a gear ratio) between the drive shaft Sout and a transmission output shaft Sect in multiple stages.

The deceleration apparatus 800 is a final deceleration unit including a differential and a reduction gear or the like.

<Operation of Embodiment>

Figure 3:
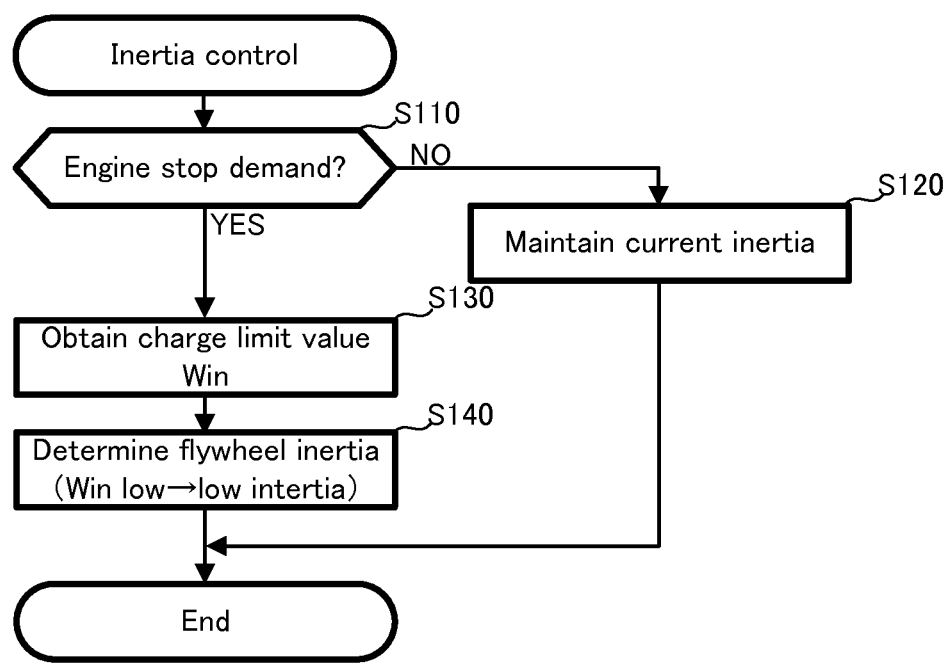
FIG. 3 is a flowchart illustrating inertia control performed by an ECU in the hybrid vehicle in FIG. 1.

Now, with reference to FIG. 3, the inertia control performed by the ECU 100 will be explained as the operation of the embodiment. FIG. 3 is a flowchart illustrating the inertia control. The inertia control is control for maintaining the inertial mass of the flywheel 300 at an optimum value. The inertia control is one of various controls performed when the ECU 100 controls the operation of the hybrid vehicle 1, and repeated with a predetermined period.

In FIG. 3, the ECU 100 judges whether or not there is an engine stop demand (step S110). The engine stop demand is a demand for stopping the engine 200 which is made, for example, if an EV driving condition for driving the hybrid vehicle 1 is satisfied only by the motor torque Tmg supplied from the motor generator MG, if a deceleration fuel cut condition is satisfied, or in similar cases. If there is no engine stop demand (the step S110: NO), the ECU 100 maintains the inertial mass of the flywheel 300 at a current value (step S120). The flywheel 300 demonstrates its effect basically on the higher inertia side from the viewpoint of its original use, and an initial value of the inertial mass is thus the maximum value on the higher inertia side. Therefore, the inertial mass of the flywheel 300 is maintained at the maximum value on the higher inertia side as long as there is no demand for changing to the lower inertia side.

If there is the engine stop demand (the step S110: YES), the ECU 100 obtains charge limit power Win of the battery 12 (step S130). The charge limit power Win is one example of the "allowable charging power" of the present invention, and is electric power (or may be a current value in terms of control) allowed to be supplied to the battery 12. The charge limit power Win is obtained from a change limit power map stored in the ROM on the basis of a SOC value of the battery 12 separately obtained by the ECU 100, temperature of the battery 12, or the like. The charge limit power Win basically becomes smaller as the SOC value approaches 100 (%).

If the charge limit power Win is obtained, the ECU 100 determines the inertial mass of the flywheel 300 according to the obtained charge limit power Win (step S140).

Here, the inertial mass of the flywheel 300 is determined to have a lower inertia side value with decreasing the charge limit power Win. In other words, the inertial mass of the flywheel 300 is determined to have a higher inertia side value with increasing the charge limit power Win. If the inertial mass is determined, the ECU 100 moves the magnetic fluid accumulated in the main body of the flywheel 300 so as to obtain the determined inertial mass. The inertial control is performed as described above.

Here, the illustration is omitted, but if there is the engine stop demand (i.e. the step 110: YES), the ECU 100 firstly controls the clutch 600 to disengage the pair of engaging elements of the clutch 600. The engine 200 is separated from the drive shaft Sout.

If the engine 200 is separated from the drive shaft Sout, the ECU 100 then reduces the number of engine revolutions to the stop allowable number of revolutions. Specifically, the number of engine revolutions NE is forcibly reduced by adjusting the power generation load of the alternator 500 and adding the regenerative torque of the alternator 500 to the crankshaft through the input shaft Sin. If the number of engine revolutions NE is reduced to a revolution region which is the stop allowable number of revolutions or less, the ECU 100 drive-controls a fuel injection apparatus of the engine 200 to stop fuel supply, and stops the engine 200.

Here, the reason why it is necessary to reduce the number of engine revolutions NE mainly comes from the NV of the hybrid vehicle 1. In other words, if the engine 200 is stopped in immediate response to the engine stop demand, engine vibration immediately after the stop is transmitted to the entire vehicle even though the drive shaft Sout and the engine 200 are separated by the clutch 600, which deteriorates the NV. Moreover, if a natural reduction in the number of engine revolutions is waited for, firstly, it takes a longer time until the number of engine revolutions NE reaches the stop allowable number of revolutions, and the effect of reducing the fuel consumption is reduced, which causes relative deterioration in fuel efficiency. Secondly, a time to pass through the resonance band of the engine 200 depends on the course of events, which possibly deteriorates the NV. For those reasons, the number of engine revolutions NE is quickly reduced by using the power generation load of the alternator 500.

Here, in particular, if the power generation load is increased during the reduction in the number of engine revolutions NE, the regenerative power of the alternator 500 increases, but it is not allowed that the regenerative power exceeds the charge limit power Win. Therefore, with decreasing the charge limit power Win, the inertial mass of the flywheel 300 is set to be on the lower inertia side. If the inertial mass of the flywheel 300 is small, the amount of the power regeneration during the reduction in the number of engine revolutions NE relatively decreases. Therefore, the number of engine revolutions NE can be reduced to the revolution region which is the stop allowable number of revolutions or less, as early as possible. As a result, according to the embodiment, it is possible to stop the engine 200 as early as possible according to the engine stop demand, and to maximize the effect of reducing the fuel consumption due to the engine stop, thereby improving the fuel efficiency.

<Second Embodiment>

Figure 4:
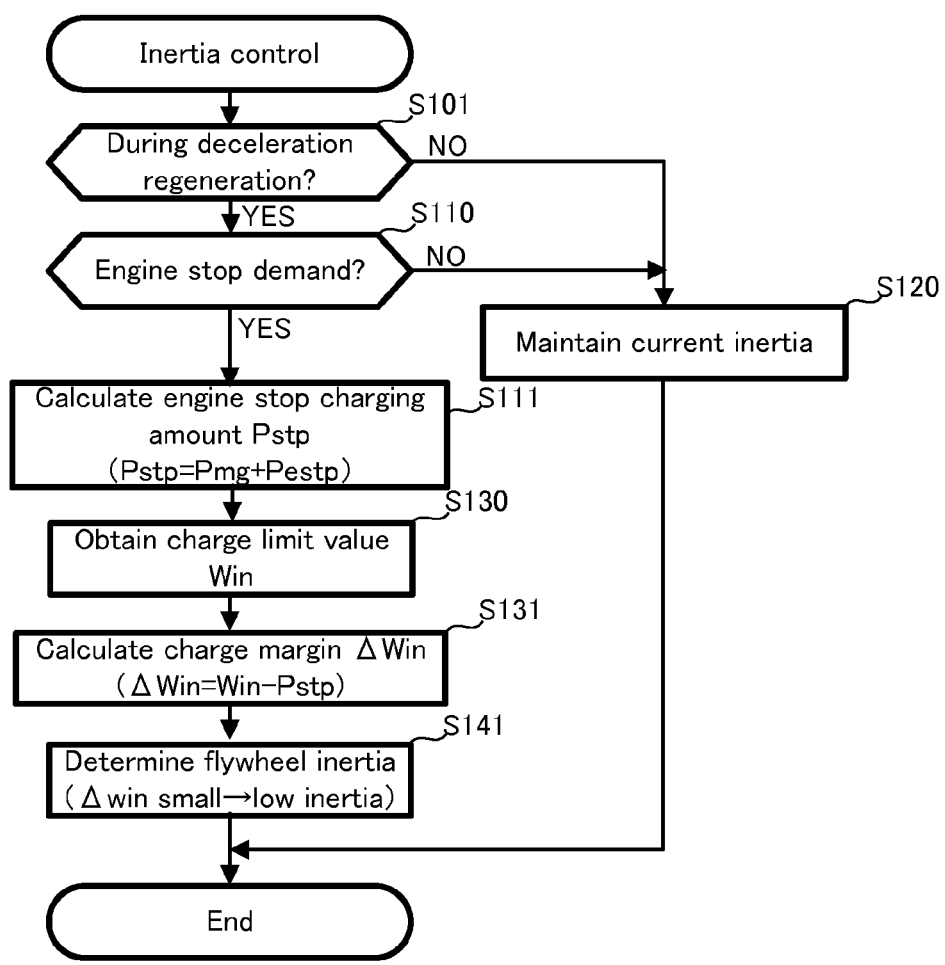
FIG. 4 is a flowchart illustrating inertia control in a second embodiment of the present invention.

In the first embodiment, the inertial mass of the flywheel 300 is controlled to increase or decrease, simply according to a large or small amount of the charge limit power Win. In the second embodiment, an aspect of controlling the inertial mass responding more to actual conditions will be explained. Now, with reference to FIG. 4, the details of the inertia control in the second embodiment will be explained. FIG. 4 is a flowchart illustrating inertia control in the second embodiment. In FIG. 4, the same parts as those in FIG. 3 will carry the same reference numeral, and the explanation thereof will be omitted as occasion demands.

In FIG. 4, the ECU 100 judges whether or not the hybrid vehicle 1 is during deceleration regeneration (step S101). The deceleration regeneration namely means the regenerative braking which uses the regenerative torque of the motor generator MG, and means that the regenerative torque is used as the braking force instead of a braking force supplied from an electronic control braking apparatus (ECB) separately provided for the hybrid vehicle 1. If the hybrid vehicle 1 is not during the deceleration regeneration (the step S101: NO), the ECU 100 maintains the inertial mass of the flywheel 300 at the current value (the step S120). If the hybrid vehicle 1 is during the deceleration regeneration (the step S101: YES), the process moves to the step S110. In other words, in the embodiment, the inertial mass is variable only during the deceleration regeneration. This is because the regenerative power associated with the deceleration regeneration, i.e. the regenerative power Pmg of the motor generator MG, is greater than the regenerative power associated with the reduction in the number of engine revolutions, i.e. the regenerative power Pestp of the alternator 500, from the practical viewpoint. In other words, if the regenerative power of the entire vehicle is only the regenerative power Pestp, it less likely exceeds the charge limit power Win, and there is no problem in many cases even if the inertial mass of the flywheel 300 is maintained on the higher inertia side.

If there is the engine stop demand (the step S110: YES), the ECU 100 calculates engine stop charging power Pstp (step S111). The engine stop charging power Pstp is expressed by the following (1); namely, the engine stop charging power Pstp is the sum of the regenerative power Pmg of the motor generator MG and the regenerative power Pestp when the number of engine revolutions is reduced by the alternator 500.

$$Pstp=Pmg+Pestp \quad (1)$$

After calculating the engine stop charging power Pstp, the ECU 100 obtains the charge limit power Win (the step S130) and then calculates a charge margin ΔWin (step S131). The charge margin is expressed by the following (2).

$$\Delta Win=Win-Pstp \quad (2)$$

After calculating the charge margin ΔWin, the ECU 100 determines the inertial mass of the flywheel 300 according to the calculated charge margin ΔWin (step S141).

The inertial mass of the flywheel 300 is determined to have the lower inertia side value with decreasing the charge margin ΔWin. In other words, the inertial mass of the flywheel 300 is determined to have the higher inertia side value with increasing the charge margin ΔWin.

The small charge margin ΔWin namely means that the charge limit power Win does not have a margin for the engine stop charging power Pstp. Therefore, by reducing the inertial mass of the flywheel 300 and further reducing the regenerative power during the reduction in the number of engine revolutions, it is possible to stop the engine 200 as early as possible according to the engine stop demand, and to maximize the effect of reducing the fuel consumption due to the engine stop, thereby improving the fuel efficiency.

On the other hand, the large charge margin ΔWin namely means that the charge limit power Win has a margin for the engine stop charging power Pstp. Therefore, by increasing the inertial mass of the flywheel 300 and further increasing the regenerative power during the reduction in the number of engine revolutions, it is possible to obtain higher power regeneration efficiency.

If the charge margin ΔWin has a negative value, i.e. if the engine stop charging power Pstp is greater than the charge limit power Win, the inertial mass of the flywheel 300 has the minimum value on the lower inertial side, but the control of reducing the number of engine revolutions NE is prohibited. The ECU 100 drives various electrically driven auxiliaries of the hybrid vehicle 1 to stimulate power consumption of the battery 12. The power consumption of the battery 12 reduces the SOC of the battery 12, and the reduction in the number of engine revolutions is allowed at a time at which the charge limit power Win increases and at which the charge margin ΔWin has a positive value. At this time, since the inertial mass of the flywheel 300 is maintained at the minimum value, the electric power to be consumed by driving the auxiliaries is minimized, and the reduction in the number of engine revolutions is allowed as early as possible.

As described above, according to the inertial control in the embodiment, the inertial mass of the flywheel 300 is determined according to the charge margin ΔWin. Thus, in comparison with a case where the inertial mass is determined simply according to the change limit power Win, it is possible to prevent a reduction in regeneration efficiency due to the fact that the inertial mass is unnecessarily set to the lower inertia side, and to prevent excessive charging power due to the fact that the inertial mass is not set to the higher inertia side when necessary, or the like. The excessive charging power in the latter case does not mean the charging beyond the change limit power Win, but means that engine stop control is not performed due to the infringement of the change limit power Win.

In the first and second embodiments, the inertial mass is determined in multiple stages according to the change limit power Win and the change margin ΔWin, respectively. As simpler control, the inertial mass may be changed in a binary manner on the basis of a comparison between the change limit power Win or the change margin ΔWin and a reference value. For example, in the case of the change margin ΔWin, only when the change margin ΔWin is less than zero, i.e. only when the stop charging power Pstp exceeds the charge limit power Win, the inertial mass of the flywheel 300 may be controlled to the lower inertia side.

Moreover, in the configuration in which the inertial mass is changed in the binary manner as described above, the inertial mass may be changed between the minimum value (or lowest inertia side value) and the maximum value (or highest inertia side value) of the inertial mass which can be adopted by the flywheel 300. In the case of the configuration in which the inertial mass is changed in the binary manner as described above, it is possible to give more variety to the structure in which the inertial mass is variable in the flywheel 300.

<Third Embodiment>

If the aforementioned inertia control in the first and second embodiments is applied, the inertial mass of the flywheel 300 has the lower inertia side value, more frequently than in the case where the inertial control is not applied. Here, if the function of varying the inertial mass of the flywheel 300 is lost in the state in which the inertial mass on the lower inertia side is adopted, there is a possibility that the NV suppression effect expected for the flywheel 300 is not sufficiently obtained in the normal operating condition which is different from an operating condition at the time of the engine stop demand.

Figure 5:
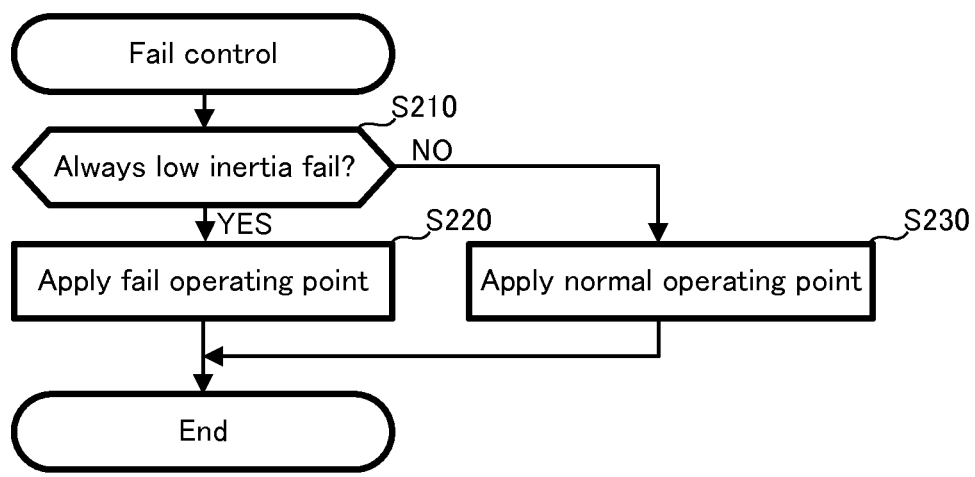
FIG. 5 is a flowchart illustrating fail control in a third embodiment of the present invention.

Now, as a third embodiment of the present invention, from the above viewpoint, fail control which supports the inertia control in the first and second embodiments will be explained. Firstly, with reference to FIG. 5, a flow of the fail control will be explained. FIG. 5 is a flowchart illustrating the fail control.

In FIG. 5, the ECU 100 judges whether or not the flywheel 300 is in a low inertial fail state (step S210). The low inertia fail state is a state in which the function of varying the inertial mass is lost in a state in which the inertial mass is less than a predetermined value. Whether or not the flywheel 300 is in a low inertial fail state can be determined, for example, from an aspect of varying the number of engine revolutions NE during the inertial mass control in the first and second embodiments. For example, if there is no change in the number of engine revolutions NE even though the inertial mass of the flywheel 300 is changed from the lower inertia side to the higher inertia side, it can be estimated that the inertial mass of the flywheel 300 is not changed regardless of a command for changing to the higher inertia side. In the case as described above, it can be determined that the flywheel 300 is in the low inertia fail state.

If the flywheel 300 is not in the low inertial fail state (the step S210: NO), the ECU 100 uses a normal map as an operating point map referred to when setting an operating point of the engine 200 (step S230), and ends the fail control. The operating point means an operating condition of the engine 200 which is defined by the engine torque Te and the number of engine revolutions NE.

On the other hand, if the flywheel 300 is in the low inertial fail state (the step S210: YES), the ECU 100 uses a fail map as the operating map (step S220), and ends the fail control.

Figure 6:
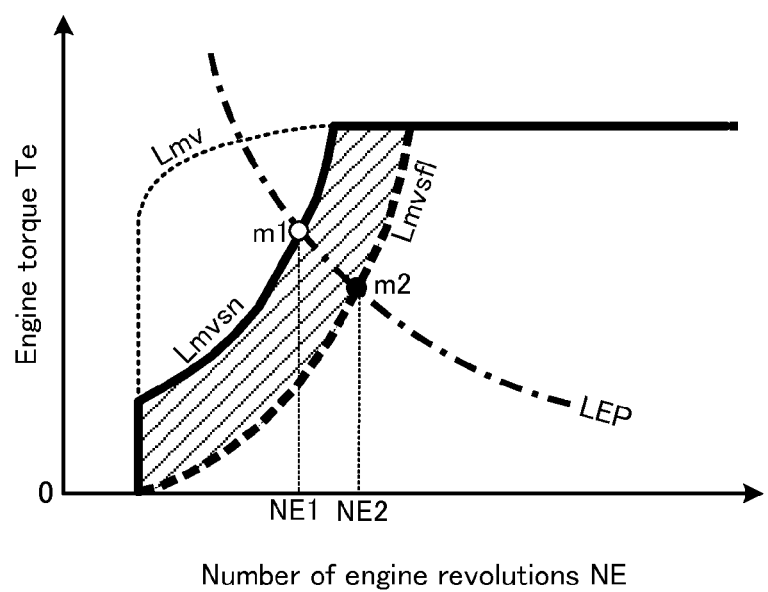
FIG. 6 is a conceptual diagram illustrating an operating point map in the control upon fail in FIG. 4.

Now, with reference to FIG. 6, the operating point map will be explained. FIG. 6 is a diagram conceptually explaining the operating point map.

In FIG. 6, the engine torque Te is illustrated on a vertical axis, and the number of engine revolutions NE is illustrated on a horizontal axis. The operating point of the engine 200 corresponds to one coordinate point in this coordinate plane.

If the operating point is not set in view of the NV, the operating point of the engine 200 is set on an illustrated optimal fuel efficiency operating line Lmb (refer to a narrow dashed line). If the NV is considered, however, practically, an operating line in the normal case (i.e. corresponding to the operating point map selected in the step S230 described above) is an illustrated Lmvsn (refer to a solid line) because a low-revolution high-torque region includes a so-called booming noise generating region.

On the other hand, the operating line in the normal case is effective if the flywheel 300 adopts the higher inertia side value (e.g. the maximum value) which is optimal from the NV suppression viewpoint. If the inertial mass of the flywheel 300 is less than this set value, the vibration suppression effect of the flywheel 300 is insufficient, and the booming noise possibly becomes obvious.

Thus, an operating line during the low inertia fail (i.e. corresponding to the operating point map selected in the step S220 described above) is changed from the illustrated Lmvsn to an illustrated Lmvsnfl (refer to a thick dashed line).

Here, if an equal output line LEP (refer to an alternate long and short dash line) in which the engine 200 has constant output Pe is expressed on the coordinate plane, the operating points selected when required output of the engine 200 is an output value corresponding to the equal output line LEP are an illustrated operating point m1 (refer to a white circle) in the normal case and an illustrated operating point m2 (refer to a black circle) during the fail.

If the operating points are compared from the viewpoint of the number of engine revolutions NE, the number of engine revolutions NE is changed from NE1 to NE2 (NE1<NE2), with a change from the operating point m1 to the operating point m2. In other words, if the flywheel 300 is in the low inertial fail state, the lower limit of the number of engine revolutions NE increases with respect to particular required output of the engine, and the operating point is changed to a higher-revolution lower-torque side. As a result, even during the low inertia fail, the generation of the booming sound in the hybrid vehicle 1 is preferably suppressed.

Incidentally, the illustrated various operating lines are quantified or digitized and stored in the actual operating map. The ECU 100 refers to each operating point map, thereby setting an optimal operating point according to the required output Pe of the engine.

If the problem during the low inertia fail is solved by the fail control as described above, it is possible to improve the fuel efficiency of the engine 200 by more actively applying the inertia control in the first and second embodiments.

The embodiment has such a configuration that it is simply judged whether or not the flywheel is in the low inertia fail state; however, there is a non-zero possibility that the low inertia fail state accidentally or temporarily occurs for some reasons, and in such a case, a special measure is sometimes not required. In view of that point, judgment of whether or not this type of low inertia fail state is continued permanently (or over a predetermined period) may be further added. In other words, with the state in which the low inertia fail state is continued, it may be judged that the flywheel 300 is in an always low inertia fail state. The always low inertia fail state is a type of low inertia fail state, and is a state in which it can be judged that there is likely a not-transient failure or abnormality in the flywheel 300.

If it is determined whether or not to be in the always low inertia fail state, the same operation and effect as the above can be realized by replacing the "low inertia fail" in the step S210 in FIG. 5 with "always low inertia fail".

The present invention is not limited to the aforementioned embodiments, but various changes may be made, if desired, without departing from the essence or spirit of the invention which can be read from the claims and the entire specification. A control apparatus for a hybrid vehicle, which involves such changes, is also intended to be within the technical scope of the present invention.

Industrial Applicability

The present invention can be applied to a hybrid vehicle with a variable inertial mass flywheel.

DESCRIPTION OF REFERENCE NUMERALS AND LETTERS 1 hybrid vehicle
10 hybrid drive apparatus
100 ECU
200 engine
300 flywheel
400 intermediate gear
500 alternator
600 clutch
700 ECT
800 deceleration apparatus
MG motor generator

The invention claimed is:

1. A control apparatus for a hybrid vehicle configured to control the hybrid vehicle, the hybrid vehicle comprising:
    an internal combustion engine in which an engine shaft is connected to a drive shaft connected to an axle;
    a flywheel with a variable inertial mass connected to the engine shaft;
    a rotary electric machine configured to perform power regeneration due to torque supply to the drive shaft and torque input from the drive shaft;
    a regenerating device configured to perform power generation due to torque input from the engine shaft; and
    an electricity storage device configured to be charged by regenerative power of the rotary electric machine and regenerative power of the regenerating device,
    said control apparatus comprising:
    a reduction control device configured to reduce the number of engine revolutions of the internal combustion engine to a stop allowable number of revolutions or less, through the regenerating device at a time of a demand for stopping the internal combustion engine;
    a stop control device configured to stop the internal combustion engine after the number of engine revolutions is reduced to the stop allowable number of revolutions or less;
    a specifying device configured to specify allowable charging power of the electricity storage device at the time of the stop demand; and
    an inertia control device configured to reduce the inertial mass with decreasing the specified allowable charging power.

2. The control apparatus for the hybrid vehicle according to claim 1, wherein said inertia control device reduces the inertial mass with decreasing difference between the specified allowable charging power and a sum of the regenerative power of the rotary electric machine and the regenerative power of the regenerating device.

3. The control apparatus for the hybrid vehicle according to claim 2, wherein said inertia control device controls the inertial mass on the basis of the specified allowable charging power during regenerative braking by the rotary electric machine.

4. The control apparatus for the hybrid vehicle according to claim 2, comprising:
    a judging device configured to judge whether or not the flywheel is in a low inertia fail state which is a state in which a function of varying the inertial mass is lost in a state in which the inertial mass is less than a predetermined value; and
    a correcting device configured to correct a lowest number of revolutions of the internal combustion engine corresponding to required output of the internal combustion engine, to a higher revolution side, in comparison with a case where the flywheel is not in the low inertia fail state, if it is determined that the flywheel is in the low inertia fail state.

5. The control apparatus for the hybrid vehicle according to claim 1, wherein said inertia control device controls the inertial mass on the basis of the specified allowable charging power during regenerative braking by the rotary electric machine.

6. The control apparatus for the hybrid vehicle according to claim 5, comprising:
    a judging device configured to judge whether or not the flywheel is in a low inertia fail state which is a state in which a function of varying the inertial mass is lost in a state in which the inertial mass is less than a predetermined value; and
    a correcting device configured to correct a lowest number of revolutions of the internal combustion engine corresponding to required output of the internal combustion engine, to a higher revolution side, in comparison with a case where the flywheel is not in the low inertia fail state, if it is determined that the flywheel is in the low inertia fail state.

7. The control apparatus for the hybrid vehicle according to claim 1, comprising:
    a judging device configured to judge whether or not the flywheel is in a low inertia fail state which is a state in which a function of varying the inertial mass is lost in a state in which the inertial mass is less than a predetermined value; and a correcting device configured to correct a lowest number of revolutions of the internal combustion engine corresponding to required output of the internal combustion engine, to a higher revolution side, in comparison with a case where the flywheel is not in the low inertia fail state, if it is determined that the flywheel is in the low inertia fail state.

* * * * *

UNITED STATES PATENT AND TRADEMARK OFFICE
CERTIFICATE OF CORRECTION

PATENT NO. : 9,174,634 B2
APPLICATION NO. : 14/402218
DATED : November 3, 2015
INVENTOR(S) : Kawai Page 1 of 1

It is certified that error appears in the above-identified patent and that said Letters Patent is hereby corrected as shown below:

In the specification

Column 1, line 67, change "No. 1104-050534" to -- No. H04-050534 --

Signed and Sealed this
Nineteenth Day of July, 2016

Michelle K. Lee
*Director of the United States Patent and Trademark Office*